July 3, 1928.
W. O. EDMONDS
RELAY SYSTEM
Filed Feb. 1, 1924
1,675,336
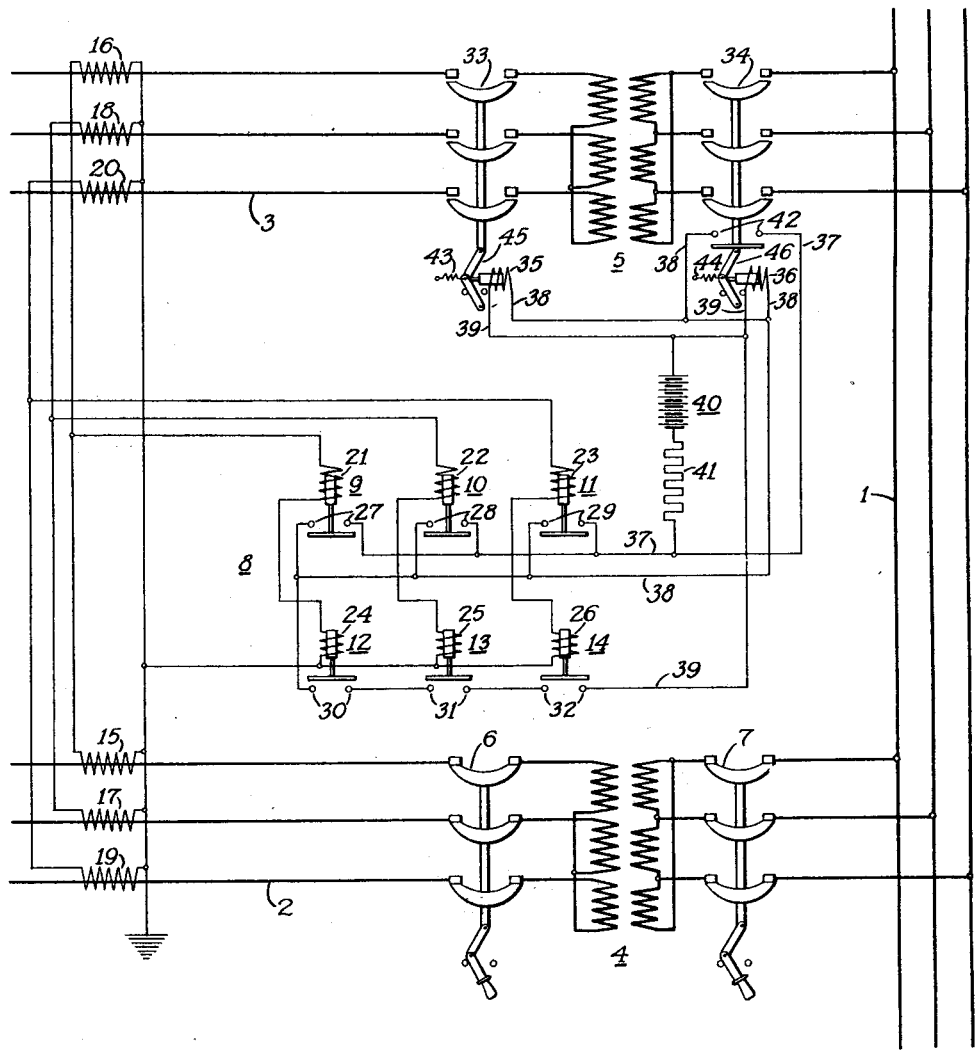
WITNESSES:
INVENTOR
Warren O. Edmonds
BY
ATTORNEY Patented July 3, 1928.

1,675,336

UNITED STATES PATENT OFFICE.

WARREN O. EDMONDS, OF KANSAS CITY, MISSOURI, ASSIGNOR TO WESTINGHOUSE ELECTRIC & MANUFACTURING COMPANY, A CORPORATION OF PENNSYLVANIA.

RELAY SYSTEM.

Application filed February 1, 1924. Serial No. 690,017.

My invention relates to relay systems and particularly to systems for controlling the operation of automatic transformer stations.

One object of my invention is to provide a relay system for automatic transformer stations that shall effect the connection of an additional transformer in circuit between a supply circuit and a distribution circuit when any phase of the transformers already connected is loaded to a predetermined degree.

Another object of my invention is to provide a system, of the above-indicated character, that shall effect the disconnection of a transformer when the total load being supplied by each phase of the operating transformers is below a predetermined value.

A further object of my invention is to provide a system, of the above-indicated character, that shall be simple to construct and effective and reliable in its operation.

My invention comprises, in general, a distribution circuit and one or more supply circuits. Between the supply circuit or circuits and the distribution circuit a plurality of transformers are adapted to be connected. A system of relays is provided for controlling the connection of certain of the transformers in circuit dependent upon the amount of energy being supplied to each phase of the distribution circuit.

The single figure of the accompanying drawing is a diagrammatic view of an electrical system in which my invention is embodied.

Referring to the drawing, a polyphase distribution circuit 1 is adapted to receive energy from one or more supply circuits or sources (not shown) through the parallel circuits 2 and 3 and the transformers 4 and 5, respectively. The supply circuits 2 and 3 may be either directly connected to a common power circuit or they may be separate circuits in which the phase conditions are in synchronism. The transformer 4 is intended to be permanently connected between the supply circuit 2 and the distribution circuit 1 by means of the manually operated circuit interrupters 6 and 7. The transformer 5, and as many more transformers as may be desired, are adapted to be connected in circuit between the supply circuit 3 and the distribution circuit 1 when the amount of energy being supplied to any phase of the distribution circuit 1 by the transformers already operating exceeds a predetermined value.

For effecting the operations described above, I provide a system of relays 8 in which my invention is embodied. This system of relays comprises a plurality of overload relays 9, 10 and 11 and a plurality of underload relays 12, 13 and 14, so connected that each overload relay and each underload relay is responsive to current conditions in each corresponding conductor of the supply circuits 2 and 3. Each conductor of the supply circuits 2 and 3 is provided with a current transformer that is connected to the relay system 8.

Current transformers 15 and 16 are connected in parallel relation to each other and operating coils 21 and 24 of the overload relay 9 and the underload relay 12 are connected in series relation to each other between the terminals of the current transformers 15 and 16. In like manner, operating coils 22 and 25 of the relays 10 and 13, respectively, are connected to current transformers 17 and 18 and the operating coils 23 and 26 of the relays 11 and 14, respectively, are connected to current transformers 19 and 20.

Thus, it will be seen that the relay system 8 comprises an overload and an underload relay for each phase of the polyphase supply circuits 2 and 3 and that these relays are responsive to the total amount of energy being supplied by each phase of the supply circuits 2 and 3 to the distribution circuit 1. The relays 9 to 11, inclusive, are adjusted to effect engagement of the respective contact members 27 to 29, inclusive, thereof whenever the conductors of the supply circuits 2 and 3 corresponding to the current transformers to which these relays are connected are traversed by a current in excess of a predetermined value. In similar manner, the underload relays 12 to 14, inclusive, are adjusted to effect engagement of their respective contact members 30 to 32, inclusive, whenever the current traversing each conductor of the supply circuits 2 and 3 is below a predetermined value.

Let us now assume that the circuit interrupters 6 and 7 are closed to connect the transformer 4 between the supply circuit 2 and the distribution circuit 1 while corresponding circuit interrupters 33 and 34 are opened so that the transformer 5 is not connected in circuit between the supply circuit 3 and the distribution circuit 1. Let us further assume that the current traversing each conductor of the supply circuit 2 is not sufficient to cause any of the relays 9 to 11, inclusive, to effect engagement of the respective contact members 27 to 29, inclusive. These conditions are indicated by the conditions of the relays as shown in the accompanying drawing.

The circuit interrupters 33 and 34 are provided with operating coils 35 and 36, respectively, that are adapted to close these circuit interrupters when energized. With the relays 9 to 11, inclusive, in the condition above described, however, no circuit is completed by means of which these coils can be energized and, therefore, the circuit interrupters 33 and 34 will remain open.

If, however, the current traversing any conductor of the supply circuit 2 exceeds a predetermined value, the current transformer corresponding to this conductor will supply sufficient energy to its corresponding overload relay to cause this relay to effect engagement of its contact members. Suppose, for instance, that the conductor corresponding to the current transformer 15 is traversed by such a current. The energy supplied by the current transformer 15 to the operating coil 21 of the overload relay 9 is then sufficient to cause this relay to effect engagement of its contact members 27.

Conductors 37 and 38 are thereby electrically connected and a circuit extending from a storage battery 40 through a resistor 41 to the coils 35 and 36, connected in parallel relation to each other is completed. The coils 35 and 36 are thus energized by the storage battery 40 to cause the circuit interrupters 33 and 34 to close.

The circuit interrupter 34 is provided with a pair of contact members 42 that are engaged when the circuit interrupter is closed. The conductors 37 and 38 are so connected to the contact members 42 that when the circuit interrupter 34 is closed, the contact members 27 are shunted by the contact members 42 and energization of the coils 35 and 36 is maintained after the contact members 27 have become disengaged.

The circuit interrupters 33 and 34, having been closed in response to an overload on any phase of the supply circuit 2, the transformer 5 is now so connected in circuit between the supply circuit 3 and the distribution circuit 1 as to assume part of the load being supplied to the distribution circuit 1 and relieve the overload on the supply circuit 2. The station will now continue to operate with both the supply circuits 2 and 3 supplying energy to the distribution circuit 1 through transformers 4 and 5, respectively, until the sum of the currents traversing each corresponding pair of conductors of the supply circuits 2 and 3 falls below a predetermined value.

Considering the corresponding conductors of the supply circuits 2 and 3 with which the current transformers 15 and 16, respectively, are associated, it will be seen that the current traversing the operating coils 21 and 24 of the relays 9 and 12, respectively, is proportional to the sum of the currents traversing these corresponding conductors of the supply circuits 2 and 3 because the current transformers 15 and 16 are connected in parallel relation to each other. When the sum of these currents falls below a predetermined value, the energy supplied to the operating coil 24 of the relay 12 by the current transformers 15 and 16 is insufficient to prevent this relay from effecting engagement of its contact members 30.

In similar manner, when each of the corresponding conductors of the supply circuits 2 and 3 is traversed by a current below the predetermined value, the contact members 31 and 32 of the underload relays 13 and 14, respectively, will also be engaged. When all of the contact members 30, 31 and 32 are so engaged, electrical connection is made between the conductors 38 and 39, that are connected directly to the operating coils 35 and 36 of the circuit interrupters 33 and 34, respectively.

When the coils 35 and 36 are thus short-circuited, they are de-energized and can no longer maintain the circuit interrupters 33 and 34 in their closed positions because of the force exerted by tension springs 43 and 44 on toggle mechanisms 45 and 46, respectively. These springs, therefore, cause the circuit interrupters 33 and 34 to open and the transformer 5 is thereby disconnected from the supply circuit 3 and the distribution circuit 1.

The transformer 5 now being disconnected from the supply circuit 3 and the distribution circuit 1, the system embodying my invention is in the same condition as was described at first, namely, with the transformer 4 alone supplying energy to the distribution circuit 1. The relay system 8, however, is ready to function at any time to cause the transformer 5 to be connected in circuit should any conductor of the supply circuit 2 be traversed by a current in excess of a predetermined value. When this connection is made, it is maintained until each of the corresponding conductors of the circuits 2 and 3 are traversed by a current below a predetermined value.

While I have shown and described only two supply circuits and two power transformers, it is obvious that an indefinite number of such circuits and transformers could be arranged to be protected by relay systems such as I have disclosed as my invention. It is also obvious that the relay system embodying my invention could be applied to any multi-circuit distribution system, either alternating or direct current. In a direct-current system, the current transformers would, of course, either be replaced with shunts or omitted altogether, in which case the load relays would be connected directly in the main circuits.

It will be understood that the system embodying my invention is not limited to the specific details of construction and connections that have been described in the foregoing specifications, as many changes and modifications may be made therein without departing from the spirit and scope of my invention, as set forth in the appended claims.

I claim as my invention:

1. The combination with a plurality of polyphase supply circuits, a polyphase distribution circuit, and a plurality of electrical translating devices adapted to be connected therebetween, of an underload and an overload relay for each phase of the circuits, the various relays being so connected with respect to each other and with respect to the supply circuits and the distribution circuit as to effect disconnection of certain of the translating devices from the supply circuits and the distribution circuit when the total load connected to each phase of the distribution circuit is below a predetermined value, and connection of certain of the translating devices to the supply circuit and the distribution circuit when the total load connected to any phase of the distribution circuit is above a predetermined value.

2. The combination with a plurality of polyphase supply circuits, a polyphase distribution circuit, and a plurality of electrical translating devices adapted to be connected therebetween, of a plurality of underload and overload relays each connected to the said supply circuits and controlling the connection of said translating devices to said circuits, the various relays being so connected with respect to each other and with respect to the supply circuits and the distribution circuit as to effect disconnection of certain of the translating devices from the supply circuits and the distribution circuit when the total load connected to each phase of the distribution circuit is below a predetermined value, and connection of certain of the translating devices to the supply circuits and the distribution circuit when the total load connected to any phase of the distribution circuit is above a predetermined value.

3. The combination with a multi-conductor supply circuit, a multi-conductor distribution circuit, and connecting means therebetween, of an underload relay and an overload relay associated with each conductor of the supply circuit, the contact members of the underload relays being so connected in series relation to each other and the contact members of the overload relays being so connected in parallel relation to each other as to effect disconnection of the connecting means from the circuits when the load connected to each conductor of the distribution circuit is below a predetermined value, and connection of the connecting means to the circuits when the load connected to any conductor of the distribution circuit exceeds a predetermined value.

In testimony whereof, I have hereunto subscribed my name this 24th day of January, 1924.

WARREN O. EDMONDS.